United States Patent
Delaporte et al.

(10) Patent No.: US 6,889,823 B2
(45) Date of Patent: May 10, 2005

(54) CURVED CONVEYOR SECTION HAVING GUIDE RAILS WITH ADJUSTABLE SPACING

(75) Inventors: Pascal Delaporte, Seclin (FR); Hervé Malvoisin, Marcq-en-Baroeul (FR); Fabien Laquay, Hem (FR)

(73) Assignee: Netra Systems, Marcq en Baroeul (FR)

( * ) Notice: Subject to any disclaimer, the term of this patent is extended or adjusted under 35 U.S.C. 154(b) by 16 days.

(21) Appl. No.: 10/221,628

(22) PCT Filed: Feb. 8, 2001

(86) PCT No.: PCT/FR01/00367
§ 371 (c)(1),
(2), (4) Date: Mar. 25, 2003

(87) PCT Pub. No.: WO01/68491
PCT Pub. Date: Sep. 20, 2001

(65) Prior Publication Data
US 2003/0164280 A1 Sep. 4, 2003

(30) Foreign Application Priority Data
Mar. 16, 2000 (FR) .............................. 00 03406

(51) Int. Cl.[7] .............................................. B65G 21/16
(52) U.S. Cl. .................. 198/836.3; 198/836.1
(58) Field of Search ................. 198/836.1, 836.2, 198/836.3, 831

(56) References Cited

U.S. PATENT DOCUMENTS

| | | | |
|---|---|---|---|
| 5,516,239 A | 5/1996 | Warren et al. | |
| 5,542,789 A | 8/1996 | Kincaid et al. | |
| 5,567,091 A | 10/1996 | Johnson et al. | |
| 5,992,616 A | * 11/1999 | Kliesow et al. | 198/836.3 |
| 6,050,396 A | * 4/2000 | Moore | 198/836.3 |
| 6,454,084 B2 | * 9/2002 | Csiki et al. | 198/836.1 |

FOREIGN PATENT DOCUMENTS

| | | |
|---|---|---|
| DE | 297 22 245 U | 2/1998 |
| FR | 2 793 228 A | 11/2000 |

* cited by examiner

Primary Examiner—James R. Bidwell
(74) Attorney, Agent, or Firm—Weingarten, Schurgin, Gagnebin & Lebovici LLP

(57) ABSTRACT

A curved conveyor section allows the transport of articles guided between two guide rails, the spacing (e) between the two guide rails is adjustable. At least one of the two guide rails is elastically deformable, an adjustment assembly is designed to displace and deform the elastically deformable guide rail so as to provide it with a specific curvature which depends on its position. Preferably, the adjustment assembly includes, for each guide rail (7), a deforming plate (9, 9') which is elastically deformable, and the guide rail (7) is rigidly secured to the deforming plate.

20 Claims, 4 Drawing Sheets

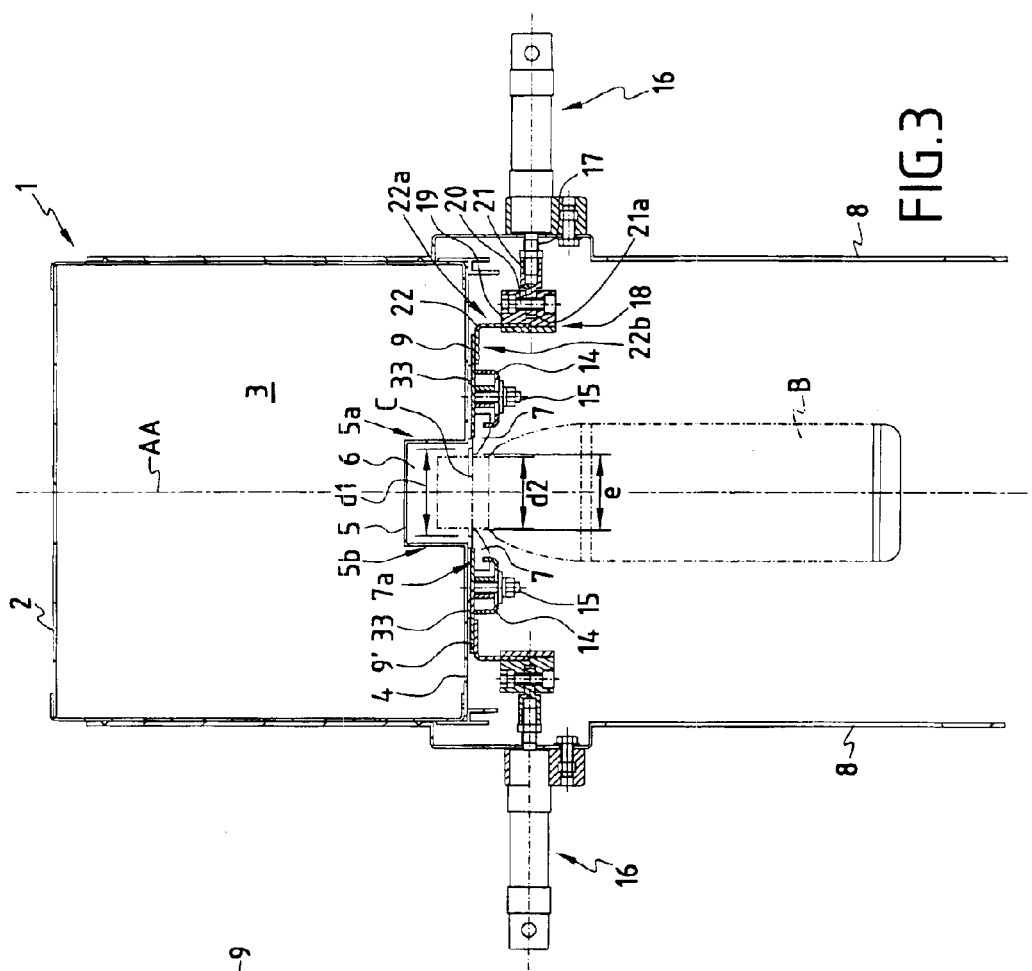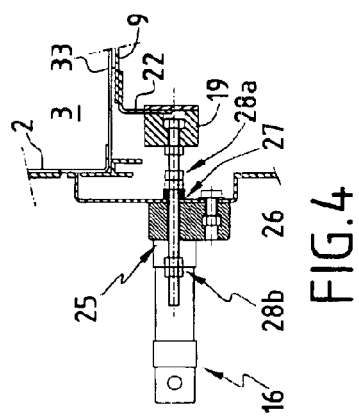

CURVED CONVEYOR SECTION HAVING GUIDE RAILS WITH ADJUSTABLE SPACING

The present invention concerns the field of the transport of articles guided between two guide rails and is more particularly used in transport under the action of air jets of suspended articles, such as plastic bottles or flasks, preforms, etc. In this field, the object of the invention is to provide a curved conveyor section using guide rails whose spacing is adjustable.

So as to transport light articles, to date air conveyors are used, said conveyors being equipped with two parallel guide rails from which said article are suspended. In this type of conveyor, the articles are transported under the action of air jets by being guided along the conveyor by the two guide rails. As this involves more particularly the transport of plastic receptacles, such as bottles or flasks, the articles are most frequently suspended from the two guide rails by means of a protuberance of their neck, commonly known as a neck. Because of this, in this type of particular application, the guide rails are still commonly known as neck-guides.

The spacing between the two guide rails depends on the size of the articles at the level of the two rails. For example, with bottles suspended by means of their neck, the spacing between the two guide rails needs to be less than the diameter of the neck and slightly larger than the diameter of the neck of the article so that the bottles are vertically retained by the guide rails.

So as to allow transport articles of varied dimensions on a given conveyor, to date there exist conveyors equipped with means for adjusting the spacing between the two guide rails. Various solutions have been described, for example, in the patent U.S. Pat. No. 5,246,314 (column 5, lines 3 to 17), the patent U.S. Pat. No. 5,516,239 (column 5, lines 26 to 32), in the European patent application EP-A-0 526 963 (column 5, lines 21 to 34) and in the European patent application EP-A-0 842 875 (column 4, lines 23 to 38). These solutions have in common the use of mechanical means for effecting a relative displacement inside a horizontal plane of the two guide rails.

Said solutions of the prior art have the main drawback of being ill-adapted to an adjustment of the spacing between the two guide rails in a curved portion (bend) of a conveyor and thus are exclusively used in rectilinear portions.

The object of the present invention is to provide a solution to the adjustment of the spacing between the two guide rails of a conveyor which is adapted to the curved conveyor portions.

Thus, the invention concerns a curved conveyor section able to transport articles guided between two guide rails and comprises means for adjusting the spacing (e) between the two guide rails.

According to the invention, at least one of the two guide rails is elastically deformable and the adjustment means have been designed to displace and deform this elastically deformable guide rail so as to provide it with a specific curvature depending on its position.

Figure 5:
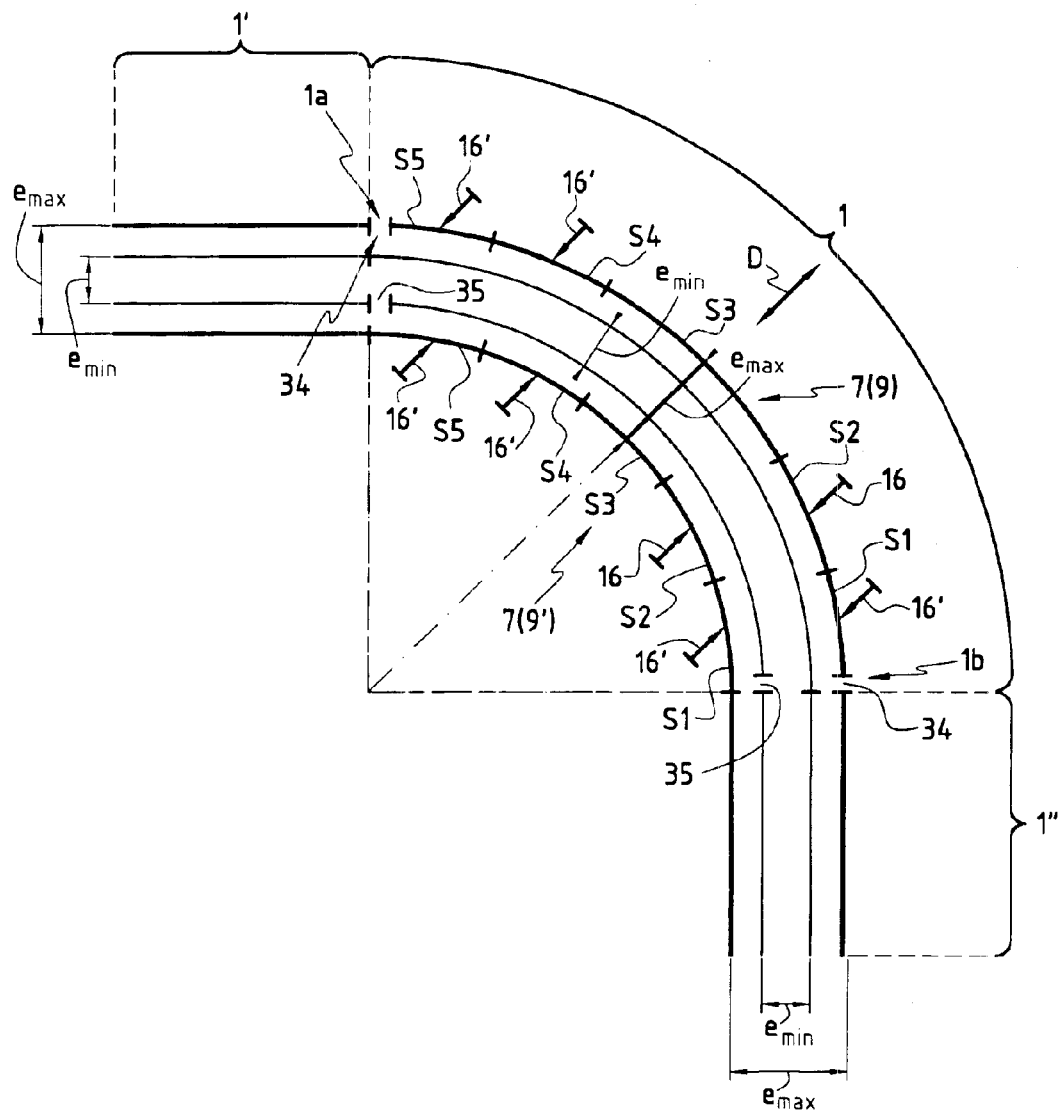

As shown more clearly hereafter with reference to FIG. 5, by means of the invention and contrary to the case with the prior art, the adjustment of the spacing between the two guide rails is accompanied by an adjustment of the curvature of the guide rail which is displaced so that the two extremities of this guide rail are still in the extension of guide rails positioned upstream and downstream and so that the spacing adjustment is constant over the entire curvature.

Figure 1:
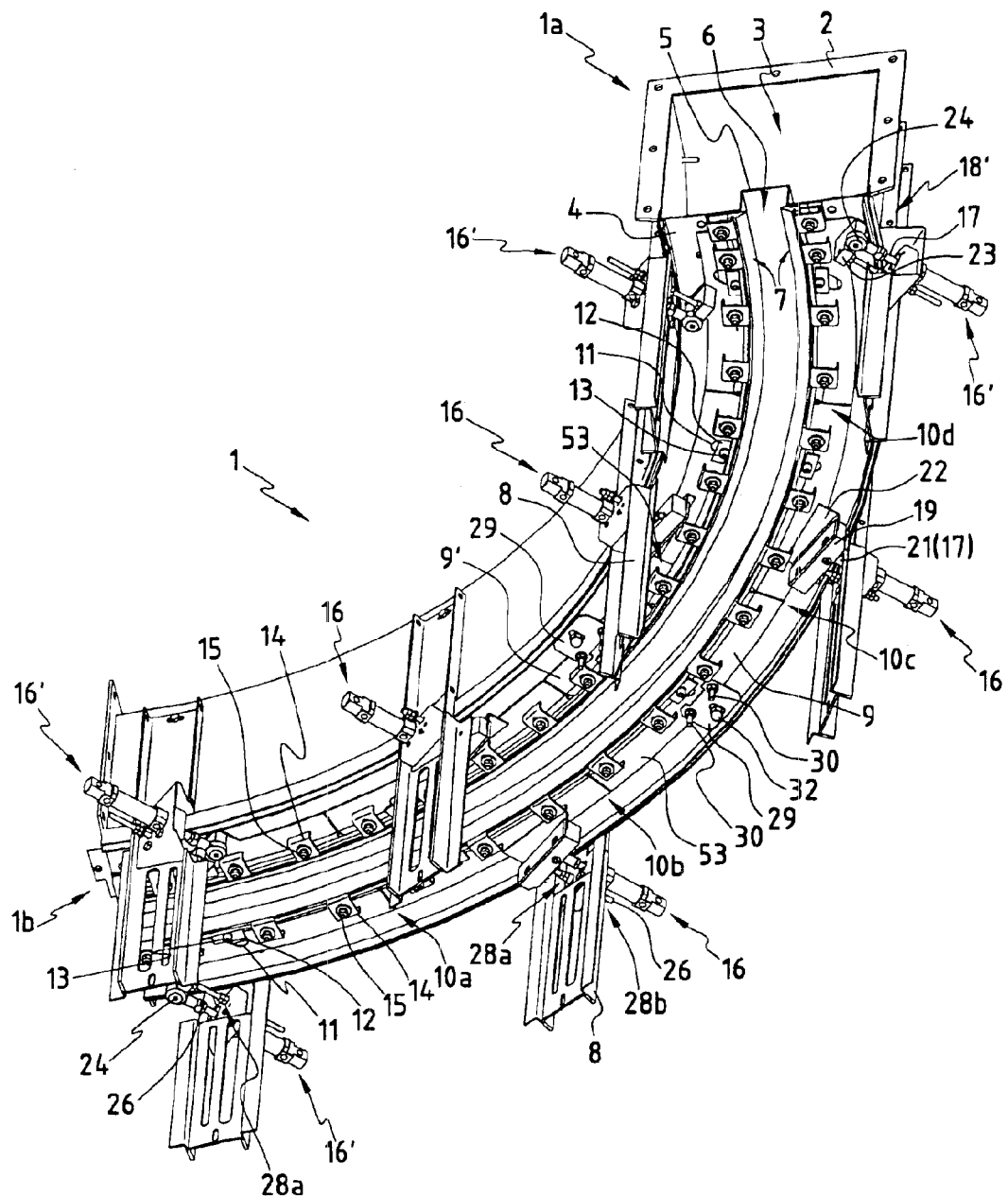
Figure 2:
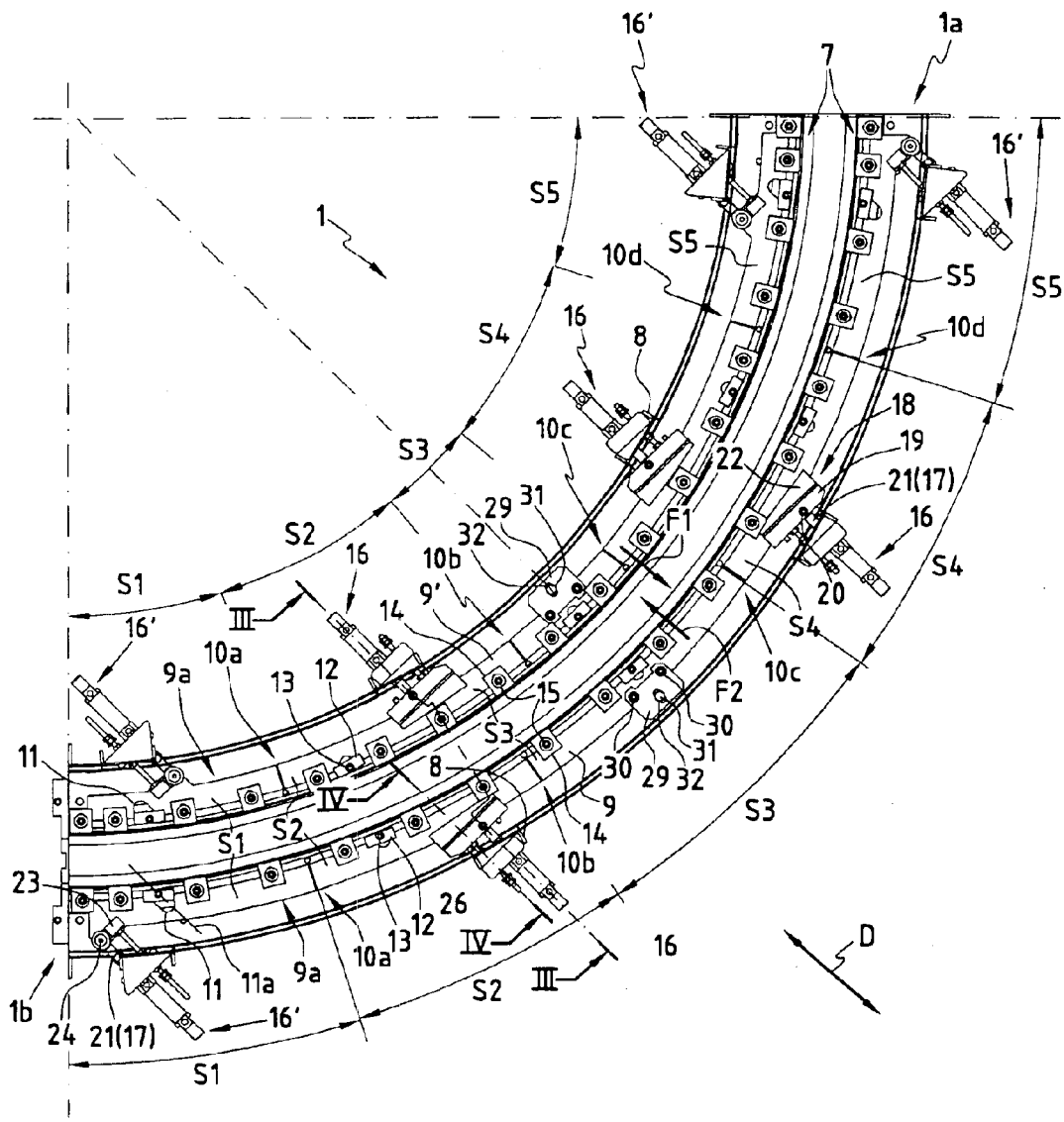

Other characteristics and advantages of the invention shall appear more clearly on a reading of the following description of a preferred embodiment variant of a curved air conveyor section conforming to the invention, said description being given by way of non-restrictive example and with reference to the accompanying drawings on which:

FIG. 1 is a perspective underneath view of a curved conveyor section in accordance with a preferred embodiment variant of the invention, FIG. 2 is a front underneath view of the section of FIG. 1, FIG. 3 is a cross section of the section of FIG. 2 according to the plane III—III, FIG. 4 is a cutaway view of the section of FIG. 2 according to the plane IV—IV which shows the details of the two adjustable end of travel stops of an adjustment jack, and FIG. 5 is a diagram illustrating the deformation principle of the guide rails when their spacing has been modified.

FIGS. 1 to 3 show a curved air conveyor section 1, which in the particular example shown forms a quarter of a circle. According to the invention, this particular shape is not the only shape possible and can be applied, not only to any arc of a circle-shaped section, but also generally to a conveyor section having any curved shape. This curved conveyor section 1 is intended to be assembled with two rectilinear sections, one downstream 1' and one upstream 1" (represented diagrammatically on FIG. 5), orientated approximately at a right angle with respect to each other and respectively being connected in the prolongation of the two extremities 1a and 1b of the curved section 1.

This curved section 1 comprises a curved blowing box 2 which is symmetrical with respect to the vertical plane AA (FIG. 3) and which delimits a chamber 3 provided so as to be normally fed with air under pressure by means of a ventilator (not shown). Secured to this box 2 is a plurality of trigger guards 8. The blowing box 2 is made for example of stainless steel and the trigger guards 8 are stainless steel sections screwed to the box 2.

The lower face of the box 2 is formed by a steel sheet 4 called hereafter as an apron and which comprises a central horizontal flexure 5 delimiting a longitudinal curved blowing channel 6. The two lateral walls 5a and 5b of this horizontal flexure 5 are provided with a plurality of blowing slits distributed evenly over the entire length of the horizontal flexure 5 and allowing the escape of air under pressure inside the chamber 3 in the form of a plurality of transport air jets generated in the blowing chamber 6.

The apron 4 is used to support two parallel guide rails 7 denoted hereafter as under neck guides and mounted symmetrically with respect to the plane AA. The spacing e (FIG. 3) between the two neck guides is constant over the entire length of the curved section and can be adjusted automatically. The details of the automatic adjustment means for adjusting this spacing shall be given subsequently.

With reference to FIG. 3, the section 1 is used to transport in a curved (bend) portion of an air conveyor articles suspended from the neck guides 7, such as the bottles B suspended from the neck guides 7 by means of their neck C. The air jets generated inside the blowing channel 6 and directed onto the bottles B above their neck C so as to aerodynamically propel the bottles in a fixed transport direction by means of the orientation of the air jets, the bottles being transported being retained vertically and guided laterally by the neck guides 7.

In this type of conveyor, the spacing e between the two neck guides 7 needs to be properly adjusted with respect to the size of the bottles and more particularly with respect to the diameter $d_1$ of the neck of the bottles and the diameter under the neck $d_1$, this spacing being fixed at a value smaller than the diameter $d_1$, of the neck and slightly larger that the neck diameter $d_2$. In practice, the difference between the spacing e and the diameter under the neck $d_2$ is extremely small which requires a finer adjustment of the spacing e. By way of indication, this difference is in practice between about 1 mm and 2 mm.

The two neck guides 7 are constituted by two arched arc-of-a-circle-shaped sections and being elastically deformable so that it is possible via a mechanical action to provide them with a radius of curvature able to be modified to be reversible. In a particular embodiment example, the two neck guides 7 are more particularly constituted by two plastic sections made for example of polyethylene.

An embodiment example of the means for automatically adjusting the spacing e between the neck guides 7 is described below in detail.

In one preferred embodiment variant, these adjustment means comprise for each neck guide 7 a deformation plate 9 or 9' having a given initial radius of curvature in an idle position. This deformation plate 9 or 9' is generally elastically deformable. More particularly, in the example shown, this deformation plate 9 or 9' is a thin plate, made of metal and more particularly of stainless steel and which is divided into several sectors S1 to S5 connected by deformable joining zones. More particularly in the embodiment example of FIGS. 1 to 3, the sectors S1 to S5 are obtained by embodying in each deformation plate 9 or 9' via the removal of material deformation slits 10a to 10d extending in the direction of the width of the plate from one of the two longitudinal edges 9a of the plate 9 or 9'. The material portion remaining at the level of each deformation slit 10a to 10d constitutes a joining zone between two sectors allowing a joining of the two sectors with respect to each other via spacing from the deformation slit.

With reference to FIGS. 1 and 2, the plates 9 and 9' are mounted on the apron 4 of the blowing box 2 respectively on both sides of the central horizontal flexure 5 of this apron 4, the plate 9 being situated outside (extrados) the curved section, and the plate 9' being situated inside (intrados) the curved portion. The deformation plate 9 (extrados) is orientated so that its longitudinal edge 9a is orientated outwardly (extrados) and the deformation plate 9' (intrados) is orientated so that its longitudinal edge 9a is orientated inwardly (intrados).

Each deformation plate 9, 9' is assembled with the apron 4 so as to be mobile in translation inside a horizontal plane and along a displacement direction symbolised on FIG. 2 by the double arrow D. This displacement direction D is preferably approximately parallel to the bisector of the angular sector (right angle in the example shown) formed by the curved section 1.

So as to enable them to move in the direction D, each deformation plate 9, 9' comprises at the level of each sector S1 to S5 oblong slits 11 with an axis 11a parallel to the displacement direction D. Each deformation plate 9, 9' is supported vertically with respect to the apron 4 by support plates 12 respectively mounted on the apron 4 by screws 13 which respectively have passed through the slits 11 of the deformation plate 9 or 9'.

So as to reduce the wear phenomena and improve sliding of the deformation plates 9, 9' with respect to the apron 4 during adjustment of the spacing e between the neck guides 7, a plate 33 with a low coefficient of friction is preferably inserted between the upper face of each deformation plate 9, 9' and the lower face of the apron 4, said plate 33 being for example a thin plate made of polytetrafluorethylene.

Each neck guide 7 is rigidly secured to the corresponding deformation plate 9 or 9' and because of this is curved along the same radius of curvature as the plate. In the example shown, this fixing is effected by means of a plurality of clamping brackets 14 more commonly known as "clamping claws" for forcefully clamping each neck guide 7 against the lower face of the deformation plate 9 or 9', the clamping force being adjusted to the level of each clamping claw 14 by a button 15. In addition, so as to facilitate the positioning of the neck guide 7 with respect to the plate, this neck guide 7 has a positioning heel 7a (FIG. 3).

The translation of each deformation plate 9, 9' along the direction D is ensured by means of a plurality of jacks 16, 16' mounted respectively on the trigger guards 8 of the curved section. In the particular example shown, for each deformation plate 9, 9', two jacks 16 are provided respectively connected to the sectors S2 and S4 of the deformation plate and two jacks 16' respectively connected to the sectors S1 and S5 of the deformation plate. Each jack 16, 16' is orientated so that its mobile rod 17 is orientated parallel to the displacement direction D. It is possible to use either electric or pneumatic jacks.

More particularly with reference to FIG. 3, the rod 17 of the jacks 16 is assembled by means of a fixing system 18 on the corresponding sector S2 or S4 of the deformation plate 9 or 9', preferably in the central portion of this sector. Each fixing system 18 includes a block 19 which for example is a plastic single piece. Screwed onto the extremity of the rod 17 of a jack 16 is a cap 21 fitted with an orifice at the level of its extreme portion 21a. This extreme portion 21a of the cap 21 is introduced into the block 19 and is rendered integral with the block 19 by a spindle 20 which is orientated vertically when the block 19 is assembled with the rod 17 of the jack and which allows a clearance in rotation along this axis of the block 19 with respect to the rod 17 of the jack 16. Each fixing system 18 also includes a square 22, for example one made of stainless steel and having a first wing 22a forcefully nested in a groove of the block 19, its other wing 22b being rigidly fixed, for example, by weld, to the lower face of the corresponding deformation plate 9, 9'.

With reference to FIG. 2, the rod 17 of the jacks 16' is fixed to the corresponding sector S1 or S5 of the deformation plate 9 or 9' by a fixing system 18' which differs slightly from the previously described fixing system 18 in that mainly the block 19 and the square 22 which are replaced by a single monoblock metal piece 23 welded onto the lower face of the deformation plate 9, 9'. This piece 23 also comprises a spindle 24 equivalent to the spindle 20 of the fixing system 18 and on which mounted rotating is the cap 21 of the rod 17 of the jack 16. This implementation difference solely is justified for reasons of spatial requirement. Thus, it is possible for all the jacks to be fixed to the deformation plate 9 or 9' by the same fixing system 18, 18' or by an equivalent system, the important fact being that this fixing system allows a slight clearance in rotation according to an approximately vertical axis of the rod 17 of the jack with respect to the deformation plate 9, 9'.

Associated with each jack 16, 16' is a system of adjustable stops able to adjust two end-of-travel positions of the rod 17 of the jack (outgoing and incoming positions). With reference to FIGS. 4, in one embodiment example this system of adjustable stops 25 includes a threaded rod 26 which is rigidly fixed at a first extremity to the block 19 of the fixing system 18 (or to the piece 23 of the fixing system 18' for the jacks 16'). This threaded rod 26 is passed through an opening 27 provided in the trigger guard 8 on which the jack 1- or 16' is mounted. Mounted on both sides of this opening 27 on the threaded rod 26 are a first nut/counter-nut unit 28a for forming an internal stop with respect to the trigger guard 8 (stop for adjusting the incoming end-of-travel position of the rod of the jack) and a second nut/counter-nut unit 28b for forming an external stop with respect to the trigger guard 8 (stop for adjusting the outgoing end-of-travel position of the rod of the jack). By adjusting the position on the threaded rod of each nut/counter-nut unit 28a, 28b, the two end-of-travel stops of the rod 17 of each jack are adjusted.

With reference to FIGS. 1 and 2, mounted at the central portion on each deformation plate 9, 9', that is on the sector S3, is a stopping plate 29 which is rigidly fixed to the deformation plate 9, 9', for example with bolts 30. In each stopping plate 29 an oblong slit 31 is made, said slit being orientated along said displacement direction D. Each stopping plate 29 is joined by means of its slit 31 onto a vertical rod 32 fixed rigidly to the apron 4 of the blowing box 2 and intended to be used as a stop on displacement of the stopping plate 29.

The automatic adjustment of the spacing between the neck guides 7 of the curved conveyor section 1 described above with reference to FIGS. 1 to 4 shall now be explained hereafter with reference in particular to FIG. 5. The thick lines on this figure show the curved conveyor section 1 in a first adjustment position of the neck guides 7 in which the spacing e between the two neck guides 7 is adjusted to a first maximum value ($e_{max}$) which is approximately constant over the entire length of the neck guides. The two neck guides 7 thus each form an arc of a circle with a given radius of curvature. With reference to FIG. 5, the neck guide 7 on the intrados of the curved section 1 is located inside the immediate elongation of the neck guides of the upstream 1' and downstream 1" rectilinear sections. The neck guide 7 on the extrados of the curved section 1 is also located in the elongation of the neck guides of the upstream 1' and downstream 1" rectilinear sections, but with a slight spacing 34 between the neck guides.

Said configuration (spacing $e_{max}$) also corresponds to that of the curved section 1 of FIG. 2. In this configuration, the rods 17 of the set of jacks 16, 16' are in an re-entering position, the nut/counter nut 28a stopping against the corresponding trigger guard 8. The stop rods 32 are not in contact with the stopping plates 29. In this configuration, the neck guides 7 are preferably not stressed and are located in their initial idle arched position. However, this is not a required condition of the invention: in another variant, in this configuration the neck guides 7 could be subjected by means of the jacks 16, 16' and the associated deformation plate 9 or 9' with a mechanical deformation stress so as to obtain the required radius of curvature.

So as to obtain the second configuration with a minimum spacing ($e_{min}$) between the neck guides 7, the jacks 16 and 16' are simultaneously activated for each neck guide (intrados and extrados). Thus, each deformation plate is displaced in the direction D by bringing it closer to the other deformation plate (FIG. 2/displacement along the arrow F1 for the plate 9' and along the arrow F2 for the plate 9), which makes it possible to reduce the spacing between the two plates 9, 9' and similarly the spacing e between the two neck guides 7. During this displacement, in a first stage the rigid unit formed by the deformation plate 9 (or 9') and the neck guide 7 undergo no deformation and are simply translated. This first stage ends when the stoppage plate 29 secured to the deformation plate 9 (or 9') arrives at the level of its slit 31 in contact with the stop rod 32 associated with it. From this moment, the central sector S3 of the deformation plate 9 (or 9') is locked in position by the stop rod 32, and in a second stage the continuation of the coming out of the rod 17 from the jacks 16, 16' in combination with the locking provided by the stop rod 32 provokes the deformation of the curvature of the plate 9 (or 9') at the level of its sectors S1, S2, S4 and S5, which makes it possible to modify the radius of curvature of the neck guide 7 borne by this deformation plate. This second stage is completed with the end-of-travel stoppage of all the jacks 16, 16' by means of the nut/counternut 28b. At the end of this second stage, each neck guide 7 has a new radius of curvature which is slightly smaller than that of FIG. 2 for the neck guide 7 secured to the deformation plate 9 (extrados) and which is slightly larger than that of FIG. 2 for the neck guide 7 secured to the deformation plate 9' (intrados).

Finally, after the bringing together and deformation of the two neck guides 7, a curved conveyor section is obtained in a second configuration in which the spacing e between the two neck guides 7 is automatically adjusted to a second minimum value ($e_{min}$) which is approximately constant over the entire length of the neck guides 7. In this configuration shown by the fine line on FIG. 5, the two neck guides 7 of the curved section 1, by means of the modification undergone by their radius of curvature, are located in the extension of the neck guides of the rectilinear sections 1' and 1" when the spacing of the neck guides of these rectilinear sections 1' and 1" has also been adjusted to the minimum value ($e_{min}$). In this second configuration, the extremities of the neck guide 7 on the intrados are slightly spaced from the extremities of the neck guides of the upstream 1' and downstream 1" rectilinear sections (spacing 35). Conversely, the extremities of the neck guide 7 on the extrados are brought close to the extremities of the neck guides of the upstream 1' and downstream 1" rectilinear sections. It ought to be stressed that this relative displacement of the extremities of the neck guides (spacings 34 and 35) is in practice extremely small and does not interfere with the actual transport of the articles. This is even more valid when this spacing 34 or 35 is only found for a given configuration on one of the two neck guides 7.

So as to appreciate the advantage of modification of the radius of curvature of the neck guides 7 where the spacing between the guides is modified, FIG. 5 shows by the dots one of the neck guides 7 being brought together without modifying its radius of curvature. It instantly appears that in such a hypothesis, this neck guide 7 of the curved section 1 is no longer located in the extension of the neck guides of the upstream 1' and downstream 1" rectilinear sections, which would completely disturb the transporting of articles during the passage of one conveyor section to another.

In the embodiment variant described above, the conveyor curved section 1 has been provided so as to only have two configurations (spacings $e_{min}$ and $e_{max}$ between neck guides 7). This simplified variant does not limit the invention and can be adapted by an expert in this field to embodying a curved section whose spacing between the neck guides 7 can be adjusted to a much larger number of different values. Equally, the invention can be used for any type of conveyor in which the articles are transported by being guided and preferably suspended from two guide rails and thus not merely restricted to the field of air conveyors.

What is claimed is:

1. Curved conveyor section for transporting articles guided between two guide rails and comprising means for adjusting the spacing between the two guide rails, characterised in that at least one of the two guide rails is elastically deformable, and in that the adjustment means have been designed to displace and deform this elastically deformable guide rail so as to provide it with a given curvature which depends on its position.

2. Curved conveyor section according to claim 1, characterised in that the adjustment means comprise for a guide rail a deformation plate which is elastically deformable, and in that the guide rail is rigidly fixed to this deformation plate.

3. Curved conveyor section according to claim 2, characterised in that the deformation plate is divided into several sectors connected by deformable joining zones.

4. Curved conveyor section according to claim 3, characterised in that the deformation plate comprises at least one deformation slit extending in the direction of the width of the plate from one of the two longitudinal edges of the plate.

5. Curved conveyor section according to claim 1, characterised in that one guide rail and the deformation plate associated with it each have the shape of and arc of a circle and in that the deformation plate is divided into at least three sectors including a central sector.

6. Curved conveyor section according to claim 5, characterised in that one guide rail and the deformation plate associated with it each have the shape of a quarter circle and in that the deformation plate is divided into at least five sectors.

7. Curved conveyor section according to claim 1, characterised in that the adjustment means comprise for a guide rail at least one fixed stop and means for displacing the guide rail with respect to this stop which allow the guide rail be deformed by resting on this stop.

8. Curved conveyor section according to claim 7, characterised in that the fixed stop is passed through a slit made directly in the deformation plate or in a stopping plate fixed rigidly to the deformation plate.

9. Curved conveyor section according to claim 1, characterised in that the adjustment means have been designed so as to displace a guide rail and exert mechanical deformation forces on this guide rail in a direction parallel to the bisector of the angular sector defined by the guide rail.

10. Curved conveyor section according to claim 1, characterised in that the adjustment means comprises several jacks.

11. Curved conveyor section according to claim 5, characterised in that the adjustment means comprises several jacks and each sector of a deformation plate, except possibly the central sector is connected to the rod of at least one jack.

12. Curved conveyor section according to claim 6, characterised in that the adjustment means comprises several jacks and the rod of each jack is secured to the deformation plate by means of a link permitting a clearance in rotation along an approximately vertical axis of the rod with respect to the deformation plate.

13. Curved conveyor section according to claim 1, characterised in that the two guide rails are elastically deformable, and in that the adjustment means have been designed to displace and deform each guide rail.

14. Conveyor for transporting articles and comprising several successive sections, characterised in that at least one of these sections is a curved section according to claim 1.

15. Curved conveyor section according to claim 4, characterised in that:
   one guide rail and the deformation plate associated with it each have the shape of and arc of a circle and in that the deformation plate is divided into at least three sectors including a central sector;
   one guide rail and the deformation plate associated with it each have the shape of a quarter circle and in that the deformation plate is divided into at least five sectors;
   the adjustment means comprise for a guide rail at least one fixed stop and means for displacing the guide rail with respect to this stop which allow the guide rail be deformed by resting on this stop;
   the fixed stop is passed through a slit made directly in the deformation plate or in a stopping plate fixed rigidly to the deformation plate;
   the adjustment means have been designed so as to displace a guide rail and exert mechanical deformation forces on this guide rail in a direction parallel to the bisector of the angular sector defined by the guide rail;
   the adjustment means comprise several jacks;
   each sector of a deformation plate, except possibly the central sector is connected to the rod of at least one jack.

16. Curved conveyor section according to claim 12, characterised in that the two guide rails are elastically deformable, and in that the adjustment means have been designed to displace and deform each guide rail.

17. Curved conveyor section according to claim 15, characterised in that the two guide rails are elastically deformable, and in that the adjustment means have been designed to displace and deform each guide rail.

18. Conveyor for transporting articles and comprising several successive sections, characterised in that at least one of these sections is a curved section according to claim 13.

19. Conveyor for transporting articles and comprising several successive sections, characterised in that at least one of these sections is a curved section according to claim 16.

20. Conveyor for transporting articles and comprising several successive sections, characterised in that at least one of these sections is a curved section according to claim 17.

* * * * *

UNITED STATES PATENT AND TRADEMARK OFFICE
CERTIFICATE OF CORRECTION

PATENT NO.         : 6,889,823 B2  
APPLICATION NO.    : 10/221628  
DATED              : May 10, 2005  
INVENTOR(S)        : Pascal Delaporte et al.

Page 1 of 1

It is certified that error appears in the above-identified patent and that said Letters Patent is hereby corrected as shown below:

Title Page, Item (57), Abstract, line 2, "rails, the" should read --rails, and the--; and Title Page, Item (57), Abstract, line 4, "deformable, an" should read --deformable, and an--;

Signed and Sealed this

Nineteenth Day of December, 2006

JON W. DUDAS  
*Director of the United States Patent and Trademark Office*